United States Patent
Gody et al.

(10) Patent No.: US 12,312,506 B2
(45) Date of Patent: *May 27, 2025

(54) POLYMERS FOR METAL SURFACE TREATMENT

(71) Applicant: SPECIALTY OPERATIONS FRANCE, Lyons (FR)

(72) Inventors: Guillaume Gody, Rueil-Malmaison (FR); Isabelle Storet, Serezin de la Tour (FR); Laurent Garel, Lyons (FR); Marie-Pierre Labeau, Se'vres (FR)

(73) Assignee: SPECIALTY OPERATIONS FRANCE, Lyon (FI)

( * ) Notice: Subject to any disclaimer, the term of this patent is extended or adjusted under 35 U.S.C. 154(b) by 305 days.

This patent is subject to a terminal disclaimer.

(21) Appl. No.: 17/999,522

(22) PCT Filed: May 10, 2021

(86) PCT No.: PCT/EP2021/062297
§ 371 (c)(1),
(2) Date: Nov. 21, 2022

(87) PCT Pub. No.: WO2021/233715
PCT Pub. Date: Nov. 25, 2021

(65) Prior Publication Data
US 2023/0203345 A1 Jun. 29, 2023

(30) Foreign Application Priority Data
May 19, 2020 (EP) ..................... 20305515

(51) Int. Cl.
| C09J 5/04 | (2006.01) |
| C08F 2/10 | (2006.01) |
| C08F 212/14 | (2006.01) |
| C08F 220/06 | (2006.01) |
| C09J 5/02 | (2006.01) |

(52) U.S. Cl.
CPC ..................... C09J 5/04 (2013.01);
C08F 2/10 (2013.01); C08F 212/24 (2020.02);
C08F 220/06 (2013.01); C09J 5/02 (2013.01);
C09J 2301/50 (2020.08); C09J 2400/166 (2013.01)

(58) Field of Classification Search
CPC ... C09J 5/04; C09J 5/02; C09J 2301/50; C09J 2400/166; C09J 133/02; C08F 2/10; C08F 212/24; C08F 220/06; C23C 22/56; C23C 22/34; C23C 22/83; C23C 2222/20; C09D 5/002; C09D 5/08; C09D 133/02; B05D 7/14

See application file for complete search history.

(56) References Cited

U.S. PATENT DOCUMENTS

| 4,191,596 A | 3/1980 | Dollman et al. |
| 4,761,189 A | 8/1988 | Mady et al. |
| 4,921,552 A | 5/1990 | Sander et al. |
| 5,534,082 A | 7/1996 | Dollman et al. |
| 12,071,495 B2 * | 8/2024 | Labeau ............ C08K 5/13 |
| 2013/0209812 A1 * | 8/2013 | Gorodisher ........ C09D 179/04 528/211 |
| 2021/0053379 A1 * | 2/2021 | Elzer ............... B41N 6/02 |

FOREIGN PATENT DOCUMENTS

| EP | 0111897 A1 | 6/1984 |
| EP | 3659716 A1 | 6/2020 |
| WO | 9713588 A1 | 4/1997 |
| WO | 0038844 A1 | 7/2000 |

OTHER PUBLICATIONS

International Search Report issued in International Application No. PCT/EP2021/062297 dated Aug. 6, 2021 (3 pages).
Written Opinion issued in International Application No. PCT/EP2021/062297 dated Aug. 6, 2021 (7 pages).

* cited by examiner

Primary Examiner — Alex B Efta
Assistant Examiner — Alexander S Wright
(74) Attorney, Agent, or Firm — Osha Bergman Watanabe & Burton LLP

(57) ABSTRACT

The instant invention concerns the use of polymers obtained by radical copolymerization of a mixture of (1) acrylic acid; (2) methacrylic acid; and (3) at least one allylcatechol selected from 4-allylbenzene-1,2-diol, 3-allylbenzene-1,2-diol; methylated forms thereof (eugenols); and mixtures thereof, for treating a metallic surface intended to be adhesive-bonded to another surface, in order to impart a resistance to the adhesive failure to the resulting bonding.

12 Claims, No Drawings

POLYMERS FOR METAL SURFACE TREATMENT

The present application is a national stage of PCT Application No. PCT/EP2021/062297 filed on May 10, 2022, which claims priority filed on 19 May 2020 in Europe with Nr 20305515.7, the whole content of this application being incorporated herein by reference for all purposes.

The instant invention relates to the field of the treatment of surfaces based on metal, and more specifically metal surfaces intended to be coated with adhesive compositions. The invention is more especially directed to a treatment of said metal surfaces aiming at providing an enhancement of the adherence of the film-forming organic.

In order to provide an enhancement of the adherence of film-forming organic compositions such as paints, varnishes or adhesives on metal surfaces, especially on aluminum or steel, several methods have been proposed, including i.a. the deposit of inorganic coatings on the surface of the metal, especially the so-called "conversion coating".

The term "conversion coating" is well known in the art and refers to a layer formed on the surface of a metal, that is an advantageous replacement of native oxide on said surface (especially on aluminum), and which is obtained by the controlled chemical formation of a film on the metallic surface by reaction with chemical elements of the metallic surface, so that at least some of the cations dissolved from the metallic material are deposited in the conversion coating.

Typically, coating such conversion coatings are obtained by reacting the metal surface with solutions containing metal cation and fluorides. In the past, chromium-containing coatings have been proposed (typically obtained by reaction of the surface with a solution including $H_2CrF_6$), and, more recently, less toxic coatings based e.g. on zirconium, titanium or other metals (for example obtained by reaction of the surface with a solution including $H_2TiF_6$, $H_2ZrF_6$, $H_2HfF_6$, $H_2AlF_6$, $H_2SiF_6$, $H_2GeF_6$, $H_2SNF_4$, or $HBF_4$). A conversion coating may include other compounds such as silane precursors for example.

For enhancing the adhesion on a coating such as conversion coatings it is known to add some additives, especially organic polymers. In this connection, it has been for example described the use of polyacrylic acids. A typical additive is ACUMER™ 1510 available from DOW (and previously from Rohm & Haas) that has been widely described for this kind of application. For more details in this connection, it may be especially be referred to WO97/13588, U.S. Pat. No. 4,191,596, or U.S. Pat. No. 4,921,552.

One aim of the present invention is to provide a new method for treating a metal surface, that imparts a good adherence of film-forming organic compositions of adhesive compositions applied to the metal surface.

To this end, the instant invention proposes to make use of a specific polymer, optionally (but not necessarily) together with (namely before, during, or after) the formation of a conversion coating, which leads to treated metal surface that reveals very interesting: when coated by a film-forming composition such as a paint, varnish or adhesive composition, a good adherence is obtained between the surface and the coated composition. Besides, a good protection of the surface is obtained, especially against corrosion. When the metal surface is coated with an adhesive layer, the coated surface may typically be used for ensuring a so-called "adhesive bonding" between said coated metal surface and another surface (typically a similar metal surface treated with the same polymer) that is placed in contact with all or part of the adhesive coating. In this application, the specific polymer used according to the invention allows a resistance to the adhesive failure. In the scope of the invention, the inventors have now observed that the strength of the adherence between the adhesive and the metal surface reveals especially high, to such an extent that cohesive failure appears instead of (or at least more preferably than) adhesive failure when a sufficiently high mechanical stress is applied for separating the adhesive-bonded surfaces.

Adhesive failure is understood to mean that failure between two surfaces bonded by an adhesive occurs at the surface, the adhesive being retained on one surface.

Cohesive failure is understood to mean that failure between two surfaces bonded by an adhesive occurs within the adhesive, which is thus retained on both surfaces.

The improvement of the bonding between two surfaces treated by the polymer of the invention and then assembled by an adhesive is thus reflected by a resistance to the adhesive failure, which means that a cohesive failure will occur instead, in particular after ageing, compared to other existing treatments.

More precisely, the instant invention make use of at least one polymer P, which is a polymer obtained by radical copolymerization of a mixture of:
  acrylic acid (AA);
  methacrylic acid (MAA); and
  at least one methylated or not methylated allylcatechol which is selected from 4-allylbenzene-1,2-diol; 3-allylbenzene-1,2-diol and mixtures thereof; and
  corresponding eugenols.

The compounds 4-allylbenzene-1,2-diol and 3-allylbezene-1,2-diol respectively have the following formulae:

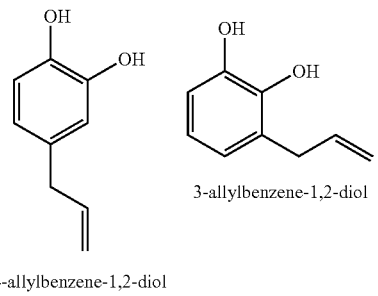

4-allylbenzene-1,2-diol 3-allylbenzene-1,2-diol

The compounds herein referred as the "corresponding eugenols" of said 4-allylbenzene-1,2-diol and 3-allylbezene-1,2-diol are the compounds having the following formulae:

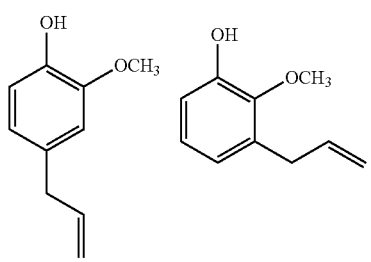

According to a specific embodiment, the polymer P typically contains a mixture of the two isomers 4-allylbenzene-1,2-diol and 3-allylbenzene-1,2-diol as the allylcatechol, with typically a molar ratio 4-allylbenzene-1,2-diol to 3-allylbenzene-1,2-diol between 30/70 and 70/30, for example between 50/50 and 70/30.

The polymer P preferably contains acrylic acid (AA) at a content of 10 to 90% in mol; methacrylic acid (MAA) at a content of 1 to 90% in mol, for example 1 to 85% in mol, and allylcatechol at a content of 1 to 20% in mol, each of the molar ratio being calculated on the basis of the total quantity of AA, MAA and allylcatechol. It is generally preferred for the ratio MAA/AA to be of more than 1/1, for example of more than 2/1, and even more than 3/1 or even 4/1. Besides, the content of methacrylic acid (MAA) is advantageously of more than 50%, for example between 55 and 85% in mol, e.g. between 60 and 80% in mol.

The molecular weight of polymer P, typically a weight average molecular weight, is typically between 10 and 150 kDa., e.g. between 15 and 100 kDa.

According to a specific embodiment, the polymer P contains allylcatechol at a content of 1 to 5% mol. In that case, the polymer P generally contains MAA at a content of at most 90% mol and has a molecular weight $M_w$ (weight average molecular weight) of 80 kDa or less.

According to another specific embodiment, the polymer P contains allylcatechol at a content of 5 to 10% mol. mol. In that case, the polymer P generally contains MAA at a content of at most 40% mol and has a molecular weight $M_w$ (weight average molecular weight) of 40 kDa or less.

According to another specific embodiment, the polymer P contains allylcatechol at a content of 10 to 15% mol. In that case, the polymer P generally contains MAA at a content of at most 20% mol and has a molecular weight $M_w$ (weight average molecular weight) of 30 kDa or less.

According to another specific embodiment, the polymer P contains allylcatechol at a content of 15 to 20% mol. In that case, the polymer P generally contains MAA at a content of at most 10% mol and has a molecular weight $M_w$ (weight average molecular weight) of 20 kDa or less.

Average molecular weights (typically weight average molecular weight) are measured by Size Exclusion Chromatography (SEC). Notably the SEC is equipped with a MultiAngle Laser Light Scattering (MALLS) Mini Dawn TREOS detector and an Agilent concentration detector (RI detector). The SEC-MALLS system is running on three columns Varian Aquagel OH mixed H, 8 μm, 3*30 cm at a flow rate of 1 mL/min and with the following mobile phase: 85% water, 100 mM NaCl, 25 mM $NaH_2PO_4$, 25 Mm $Na_2HPO_4$ —15% methanol. Polymer samples were diluted down to 0.5 active wt % in the mobile phase for at least 4 hours then filtrated in a Millipore filter 0.45 μm and 100 microliters were injected in the mobile phase flow. Absolute molar masses were obtained with the dn/dC of the poly (acrylic acid) equal to 0.1875 mL/g.

One specific object of the instant invention is the use of at least one polymer P as defined above for treating a first metallic surface (S1) intended to be bonded to a second surface (S2) by adhesive bonding and for imparting a resistance to the adhesive failure to the bonding. An additional advantage of the adhesive bonding obtained according to the invention is that it is highly resistant to corrosive atmospheres and to wet atmospheres, which lead to long lasting adhesive bonding. In most cases, the polymer is also used for obtaining this additional effect (namely for further imparting to the bonding a resistance to corrosive atmospheres and to wet atmospheres, in other words for obtaining both a very effective, but also long lasting adhesion). In other words, the use of at least one polymer P as defined above for treating a first metallic surface (S1) intended to be bonded to a second surface (S2) by adhesive bonding and for imparting a resistance to the adhesive failure to the bonding is also providing a very good resistance to ageing of the adhesive bonding. Such a property can be measured according to tensile tests on so-called "Single Lap Shear" (SLS) assemblies, such as defined in ASTM D-1002 10, performed on freshly bonded SLS assemblies and performed on SLS assemblies after ageing in corrosive atmospheres, wet atmospheres, or repeated cycles of corrosive atmospheres followed by wet atmospheres, such as ASTM G85 A3. Other tests simultaneously combine a corrosion stress and a mechanical stress (eg compression load), such as the By 101-07, known as Ford Durability Stress Test For Adhesive Lap-shear Bonds or Arizona Proven Ground Exposure (APGE). Notably an adhesive bonding with the polymer P according to the invention between two surfaces S1 and S2 has been demonstrated to provide failure facies, after ageing, that remain more cohesive.

Typically (but not necessarily), the second surface (S2) is also a metallic surface, having or not the same nature as the first surface (S1). According to an advantageous embodiment, the second surface (S2) is a metallic surface also treated with a polymer P of formula (a), generally but not necessarily identical to the polymer P of the first surface (S1).

More generally, the polymer P used according to the invention is preferably used for treating both surfaces (S1) and (S2) before the adhesive bonding of the two surfaces, especially when (S2) is a metallic surface.

According to a preferred embodiment, the surfaces treated according to the invention are rinsed after the treatment with the polymer P. The sought improvement reveal to be well better with a rinsing step following wherein the treatment of the surface (S1) and if any of the surface (S2) with the polymer P.

The first metal surface (S1) to be treated is preferably a surface comprising a metal selected from aluminum, steel, zinc, magnesium, titanium, copper and their alloys, or cobalt-nickel alloys. The invention is especially interesting for metal surface of aluminum or aluminum alloy.

The second surface (S2) may be metallic or non-metallic surface.

According to an interesting embodiment, the second surface (S2) is a surface comprising a metal, advantageously selected from aluminum, steel, zinc, magnesium titanium, copper and their alloys, or cobalt-nickel alloys. According to one embodiment, the nature of the surfaces (S1) and (S2) is the same, but they can also be distinct according to other possible embodiments of the invention. According to an interesting variant, both surfaces (S1) and (S2) are metal surface of aluminum or aluminum alloys.

According to another possible embodiment, the second surface (S2) is a non-metallic surface, for example a plastic surface e.g. based on polyamide, PEEK or ABS; or a composite surface based e.g on CFRP or Glass Fiber Reinforced Plastics.

Whatever the exact nature of surfaces (S1) and (S2), according to a possible embodiment, a conversion coating may be applied on the metallic surface (S1), by reaction of said surface with a conversion composition (in other words, a conversion composition a is applied on the metallic surface for forming a conversion coating thereon). The use of a conversion coating is however not compulsory according to the invention, and, according to a specific embodiment, no conversion coating is applied on the surface (S1). When a conversion composition is used, typically:

the conversion composition includes all or part of the polymer P as an additive; and/or the conversion coating is applied on the surface (S1) and then all or part of the polymer P is applied on the conversion coating.

The second surface (S2) may also receive a similar conversion coating, in the same conditions, especially when this second surface (S2) is a metallic surface. But again, the use of a conversion coating is not compulsory according to the invention, and, according to a specific embodiment, no conversion coating may be applied on the surface (S2).

According to another possible embodiment, compatible with the previous ones, all or part of the polymer P is contained in the adhesive composition applied onto the surfaces (S1) and (S2). According to this embodiment, the polymer may typically be introduced in the adhesive composition as a solid powder, said powder comprising the polymer alone or the polymer at the surface of a mineral filler (said powder may typically be obtained by spray drying a solution or suspension of the polymer, typically in presence of mineral filler).

According to another aspect, one other specific object of the invention is a process for bonding a first metallic surface (S1) with a second surface (S2) (said surfaces being preferably as defined above), including:

treating said first surface (S1) with at least one composition including at least one polymer P as defined above above (said surface (S1) being preferably cleaned and/or activated before the treatment with the polymer P); and optionally treating the second surface (S2) with at least one composition including at least one polymer P as defined above (said surface (S2) being then preferably cleaned and/or activated before the treatment with the polymer P); and bonding the surfaces (S1) and (S2) via an adhesive composition applied between the two surfaces.

In that scope, the composition comprising the polymer P may typically be:

a conversion composition including a polymer P; and/or a solution or a dispersion of the polymer P, preferably applied on the surface after having applied a conversion coating on the surface to be treated; and/or the adhesive composition, that may comprise all or part of the polymer P.

Typically, the polymer P is present in the conversion composition and/or in a solution or dispersion applied on a conversion coating. In that case, the adhesive is applied on a surface previously treated by the polymer.

According to some specific embodiments, an additional layer is applied between the treated surface (S1) and the adhesive (this is for example the case for the treatment of metal coil or part on a first site, that has then to be bonded on a second site: in that case, a lubricant may be applied on the treated coil or part, in order to protect it during transportation and storage and to facilitate downstream operations (coil cutting into sheets, blanking, stamping, forming, . . . ).

According to yet another aspect, a specific object of the instant invention are the materials comprising two adhesive-bonded surfaces including a first metal surface comprising a metal surface (S1) which is in all or part (i) treated with a polymer P as defined above and (ii) bonded to a second surface (S2) preferably as defined above via an adhesive.

These materials include i.a. materials that have a metal surface (S1) in all or part covered by:

at least one coating (typically a conversion coating and/or a paint, a varnish or an adhesive layer) comprising at least one polymer P; and/or a layer (typically a conversion coating) comprising a reaction product of the polymer P as defined above with a metal of the treated surface or another compound present in said layer, or a polymer P strongly linked with said other compound (via a complexation, a ionic bonding or hydrogen bonding for example).

Specific features and possible embodiments will now be described in more details.

The Metal Surface (S1)

Any metal surface may be treated with polymer P of the invention, but the invention is especially suitable for treating metal surfaces of:

aluminum or an aluminum-based alloy; or steel, for example galvanized steel (hot dip galvanized HDG or electrogalvanized EG); or cold rolled steel (CRS); or magnesium or magnesium-based alloys; or Zinc or zinc-based alloys; or Titanium or titanium-based alloys.

The invention is especially interesting for metal surface of aluminum and aluminum alloys, such as Aluminum Alloy AA 5005 tested in the appended examples, or other alloys such as those of Series 1xxx, 2xxx, 3xxx, 4xxx, 5xxxx, 6xxx, 7xxx, such as AA1050, 2024, 3003, 5182, 5754, 6111, 6016, 6060, 6063, 6182, 7075.

The Optional Conversion Coating

When a conversion coating is applied on one or both of the surfaces (S1) and/or (S2), it may be obtained by contacting the surface with any conversion composition known from the prior art.

Contacting the metal surface with the conversion composition may be made by any means known per se, such as dip coating in a conversion bath or spray coating, as illustrative examples.

The conversion composition used according to the invention may typically contain fluorides anions and cationic metals, e.g. compounds such as $H_2CrF_6$, or more preferably chromium free compounds such as $H_2TiF_6$, $H_2ZrF_6$, $H_2HfF_6$, $H_2AlF_6$, $H_2SiF_6$, $H_2GeF_6$, $H_2SNF_4$, or $HBF_4$.

The conversion composition may also include other compounds, such as silane precursors for example, and/or cerium salts, and/or terbium molybdate.

In addition, according to a specific embodiment, the conversion composition may contain all or part of the polymer P used according to the invention for treating the surface. In that case, the application of the conversion layer leads per se to a surface treatment according to the invention.

Otherwise, the treatment is typically obtained after the formation of the conversion layer, by contacting the metal surface carrying the conversion layer with the polymers P (they may typically be applied on the conversion layer in the form of a solution or a suspension of polymers P, or within a paint, a varnish or an adhesive composition applied on the conversion layer).

According to a specific embodiment, it may be contemplated to make use of the polymer P both in the conversion composition and within the adhesive composition applied on the conversion layer.

Should the disclosure of any patents, patent applications, and publications which are incorporated herein by reference conflict with the description of the present application to the extent that it may render a term unclear, the present description shall take precedence.

The following examples illustrate the invention.

EXAMPLE 1

Synthesis of Polymers Useful According to the Invention

Poly(AA-stat-MAA-stat-allylcatechol)

EXAMPLE 1.1

A polymer P1 (AA/MAA/allyl catechol=26/70/04 mol/mol/mol) was prepared as follows: 4-allylpyrocatechol (5.50 g, 36.6 mmol) having a molar ratio 4-allylbenzene-1,2-diol and 3-allylbenzene-1,2-diol of 60/40, acrylic acid (AA) at 58.4% in water (1.47 g, 11.9 mmol) and 2,2'-Azobis(2-methylpropionamidine)dihydrochloride (V-50) at 5% in water (74.49 g, 13.7 mmol) were added in a 500 mL three-neck round-bottom flask. After stirring for 20 minutes under nitrogen, the round-bottom flask was placed into a 66° C. oil bath. After 10 minutes, two aqueous solutions of AA at 58.4% (13.96 g, 113.1 mmol) and methacrylic acid (MAA) at 58.4% (37.79 g, 256.4 mmol) were added dropwise over 2 hours. After completion, two aqueous solutions of AA at 58.4% (13.96 g, 113.1 mmol) and MAA at 58.4% (56.68 g, 384.5 mmol) were again added dropwise over 4 hours and 6 hours respectively. After a final 2 hours cooking, the round-bottom flask was removed from the oil bath.

The reaction mixture was analysed by 1H NMR spectroscopy and size exclusion chromatography.

A Brucker 300 MHz spectrometer was used to record proton nuclear magnetic resonance (1H NMR) spectra. To measure AA, MAA and 4-allylpyrocatechol conversions, four drops of the reaction mixture was diluted in around 1 g of deuterated water (D2O). AA conversion=99%; MAA conversion=97%; 4-allylpyrocatechol conversion=91%

Molar masses were measured by Size Exclusion Chromatography (SEC) equipped with a MultiAngle Laser Light Scattering (MALLS) Mini Dawn TREOS detector and an Agilent concentration detector (RI detector). The SEC system is running on three columns Agilent Aquagel OH mixed H, 8 μm, 3*30 cm at a flow rate of 1 mL/min and with the following mobile phase: $H_2O$ 100% vol. 0.1 M NaCl, 25 mM NaH2PO4, 25 mM Na2HPO4 buffer solution pH 7. Polymer samples have been dissolved at 0.5 wt % in the mobile phase for at least 4 hours then filtrated in a Millipore filter 0.45 μm. Absolute molar masses were obtained with the dn/dC of the poly(acrylic acid) equal to 0.1875 mL/g. Mw=33 kg/mol; Mn=16.5 kg/mol; Đ=1.9

EXAMPLE 1.2

A polymer P2 (AA/MAA/allyl catechol=80/12/08 mol/mol/mol), was prepared with the same protocol as in example 1.1 with the differences identified in the Table 1 below, with the following results: AA conversion=96%; MAA conversion=99.9%; 4-allylpyrocatechol conversion=81%–Mw=29 kg/mol; Mn=14 kg/mol; Đ=2

TABLE 1 preparation of polymers P1 and P2

Monomers used and how they are added (initial/feeds#1 and/or feeds#2)

| Polymer | | Global quantity | | Initial fraction | Feeds #1 * | | Feeds #2 ** | |
|---|---|---|---|---|---|---|---|---|
| | | mass (g) | mmol | in the reactor | fraction added | duration | fraction added | duration |
| P1 | allyl catechol | 5.50 | 36.6 | 100% | — | | — | |
| | AA | 17.16 | 238.1 | 5% | 47.5% | 2 h | 47.5% | 4 h |
| | MAA | 55.17 | 640.9 | — | 40% | 2 h | 60% | 6 h |
| P2 | allyl catechol | 11.00 | 73.2 | 100% | — | | — | |
| | AA | 52.73 | 732.0 | 10% | 40% | 1 h | 50% | 3 h |
| | MAA | 9.45 | 109.8 | — | 40% | 1 h | 60% | 3 h |

* both feeds start 10 mn after heating
** both feeds start when feeds #1 are over

EXAMPLE 2

Use of the Polymers of Example 1

Performances of the polymers P1 and P2 were assessed through Single Lap Shear (SLS) tests, before and after ageing in corrosive conditions. Coupons were prepared according to the protocol below and assembled to form Single Lap assemblies as described in D1002-10.

Step 1-20 coupons (aluminum alloy coupons: AA5754, from FBCG; 100 mm long, 25 mm wide, 3 mm thick) are cleaned and etched all together in one single step, combining cleaning and etching, in a 4 L bath at 50° C. contained in a stainless steel tank, typically made by diluting a commercially available formulation, DBT ALU 200, available from Chemtec Aertec (5 g of DBT ALU 200 into 995 g of water) for 3 mn under light stirring. The coupons were then rinsed twice during 1 mn with deionized water.

Step 2—the coupons are then pre-treated by dipping for 2 mn in the treatment bath, containing the polymer at 50° C. and at several concentration indicated in the Table 1 below. They are then rinsed altogether (except for one test identified in Table 2) with a flow of deionized water for 1 mn and dried for 30 mn at 60° C.

Step 3—the coupons are then assembled in pairs, each pair forming a so called single lap shear "assembly": two coupons are placed horizontally, parallel, one above the other forming an overlap of 12.5 mm long and 25 mm wide ("overlap zone", including one of terminal zone of each of the two coupons of 25 mm wide, namely the last 12.5 mm of the 100 mm length of the coupon). A structural high T curing epoxy adhesive bead (Betamate 1496, from Dow) is applied with a gun under 7 bars on the overlap zone of the lower coupon. The upper coupon is then pressed, thus forming a bonding zone of 12.5 mm long, and 25 mm wide. Paper clips are used to maintain the assembly integrity before and during curing. The adhesive is then cured according to adhesive producer guidelines, typical for 40 mn at 180° C. Finally, paper clips are removed.

Step 4—tensile strength test I on assemblies as obtained in step 3

Used material: Zwick/Roell—Z50, with jaws grasping assembly tips over 50 mm and a pulling speed of 10 mm/mn (each jaw holds one of the bonded coupon of the pair, on a grasping zone of 50 mm of said coupon located at the end zone of each coupon opposite to the overlap zone. The jaws are then moved for pulling each of the coupon horizontally in the direction starting from the bonding zone towards the grasping zone)

Step 5—tensile strength test II performed on assemblies as obtained in step 3 after ageing 5.1. Ageing Cyclic Test A cyclic ageing test is performed according to ASTM G85—Annex 3 (SWAAT, 2011) in a corrosion chamber Q-FOG CRH 600L, from Q-FOG in the following conditions:
  a 30-minute acidified salt fog spray followed by
  a 90-minute soak at >98% relative humidity
under the following conditions:
  Chamber temperature—constant 49° C.
  Air saturator temperature—constant 57° C.
  Relative humidity—>98%
  pH of fall out solution—2.8-3.0
  Volume of fall out solution—1.0-2.0 ml/80 cm²/hour
  Exposure period—1000 hours After the exposure period is completed, the assemblies are washed down with luke-warm water to remove and neutralise excess acid and any remaining salt residues. All assemblies were then air dried using forced ambient temperature before being for submitted to lap-shear tensile testing.

5.2. Tensile Strength Test

In the conditions of the tensile strength test I of step 4

The obtained results are reported in Tables 2-4 below (the values are average values: 3-4 assemblies were tested before ageing, 5 assemblies were tested after ageing), with the following variations in step 2:

TABLE 2

| | | conditions of step 2 | | |
|---|---|---|---|---|
| Test no. | Polymer | Concentration of polymer in the treating bath | pH | Rinsing step after treatment |
| 1 | NONE (control) | — | — | — |
| 2 | P1 | 1000 ppm | 2.47 | yes |
| 3 | P2 | 1000 ppm | 2.54 | yes |
| 4 | P2 | 1000 ppm | 2.54 | no |

TABLE 3

Maximum STRAIN

| | Before ageing (test I) | | After ageing (test II) | | |
|---|---|---|---|---|---|
| Test no. | maximum strain (MPa) | STD (MPa) | maximum strain (MPa) | STD (MPa) | Retention (%) |
| 1 (control) | 34.7 | 0.7 | 12.4 | 13.7 | 36 |
| 2 | 35.7 | 0.9 | 28.0 | 1.8 | 78 |
| 3 | 27.1 | 1.0 | 21.2 | 8.2 | 78 |
| 4 | 27.1 | 1.3 | 14.1 | 11.9 | 52 |

TABLE 4

Maximum LOAD

| | Before ageing (test I) | | After ageing (test II) | | |
|---|---|---|---|---|---|
| Test no. | maximum load (N) | STD (N) | maximum load (N) | STD (N) | Retention (%) |
| 1 (control) | 10837.9 | 217.7 | 3862.4 | 4292.6 | 36 |
| 2 | 11159.0 | 269.3 | 8735.5 | 556.9 | 78 |
| 3 | 8482.0 | 309.8 | 6637.4 | 2549.6 | 78 |
| 4 | 8461.4 | 395.1 | 4398.0 | 3714.1 | 52 |

TABLE 5

Maximum ENERGY

| | Before ageing (test I) | | After ageing (test II) | | |
|---|---|---|---|---|---|
| Test no. | maximum Energy (J) | STD (MPa) | maximum Energy (J) | STD (MPa) | Retention (%) |
| 1 (control) | 12 | 0.8 | 2.8 | 4.0 | 24 |
| 2 | 13.1 | 1.1 | 8.3 | 1.1 | 63 |
| 3 | 16.1 | 2.7 | 7.1 | 4.7 | 44 |
| 4 | 6.3 | 1.0 | 3.0 | 2.7 | 47 |

TABLE 6

FACIES after failure

| Test no. | Before ageing (test I) | After ageing (test II) |
|---|---|---|
| 1 (control) | c | a |
| 2 | c | ~c |
| 3 | c | a/c |
| 4 | ~a | ~a |

(c): cohesive fracture
(~c): rather cohesive fracture
(a): adhesive fracture
(~a): rather adhesive fracture
(a/c): 50% adhesive 50% cohesive

EXAMPLE 3

Comparative Polymers C2, C3:

Two comparative polymers were prepared with benzotriazole ethyl methacrylate instead of allyl cathecol. Details are given below:

General formula:

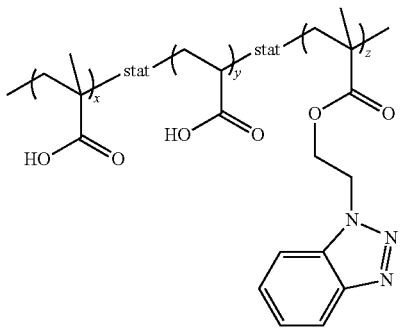

Comparative Polymer C2: 4 Mol % of Benzotriazole Ethyl Methacrylate (BztMA)
MAA/AA/BztMA=76/20/4 mol %
Mw=30 000 g/mol, Mn=15 000 g/mol (same method of measure as described previously).
Comparative Polymer C3: 10 Mol % of Benzotriazole Ethyl Methacrylate (BztMA)
MAA/AA/BztMA=67/23/10 mol %
Mw=30 000 g/mol, Mn=15 000 g/mol (same method of measure as described previously).

EXAMPLE 4

Use of Comparative Polymers C2, C3

Performances were assessed through Single Lap Shear (SLS) tests, before and after ageing in corrosive conditions. Coupons were prepared according to the protocol described for example 2 and assembled to form SLS assemblies as described in D1002-10.
Conditions
Step 1: the bath is prepared with Chemtec DBT ALU 200 at 5% and heated to at 50° C. Coupons are immersed in it for 3 mn, and are then rinsed for 1 mn in hot water and then de-ionized water.
Step 2: the bath is heated to 50° C.; the pH is adjusted with sulfuric acid; coupons are immersed for 2 mn and are then rinsed for 1 mn with de-ionized water.

TABLE 7 conditions of step 2

| Test no | Polymer | Details | Polymer concentration in the treatment bath | Treatment bath pH |
|---|---|---|---|---|
| 4.1 | None | NONE (control) | NONE (control) | — |
| 4.2 | C2 | MAA/AA/BztMA: 76/20/4 Mw 30 000 g/mol - Mn 26 000 g/mol | 200 ppm | 2.34 |
| 4.3 | C2 | MAA/AA/BztMA: 76/20/4 Mw 30 000 g/mol - Mn 26 000 g/mol | 1000 ppm | 2.36 |
| 4.4 | C3 | MAA/AA/BztMA: 67/23/10 Mw 30 000 g/mol - Mn 26 000 g/mol | 200 ppm | 2.32 |
| 4.5 | C3 | MAA/AA/BztMA: 67/23/10 Mw 30 000 g/mol - Mn 26 000 g/mol | 1000 ppm | 2.40 |

TABLE 8

STRAIN at maximum Load

| | STRAIN at Maximum Load | | | | |
|---|---|---|---|---|---|
| | Before ageing (test I) | | After ageing (test II) | | |
| Test no. | Av. strain (MPa) | STD (MPa) | Av. strain (MPa) | STD (MPa) | Retention (%) |
| 4.1 | 28.2 | 1.4 | 21.9 | 1.5 | 78 |
| 4.2 | 29.6 | 0.5 | 25.7 | 0.5 | 87 |
| 4.3 | 28.7 | 0.4 | 22.4 | 1.7 | 78 |
| 4.4 | 27.7 | 0.8 | 22.9 | 1.0 | 83 |
| 4.5 | 27.7 | 0.2 | 17.8 | 0.4 | 64 |

TABLE 9

MAXIMUM LOAD

| | Maximum Load | | | | |
|---|---|---|---|---|---|
| | Before ageing (test I) | | After ageing (test II) | | |
| Test no. | Av. Max. Load (N) | STD (N) | Av. Max. Load (N) | STD (N) | Retention (%) |
| 4.1 | 9056 | 356 | 7410 | 663 | 82 |
| 4.2 | 9435 | 66 | 7948 | 177 | 84 |
| 4.3 | 9225 | 114 | 7154 | 422 | 78 |
| 4.4 | 8862 | 177 | 7260 | 306 | 82 |
| 4.5 | 8822 | 85 | 5513 | 85 | 62 |

TABLE 10

Energy at maximum Load

| | Energy at Maximum Load | | | | |
|---|---|---|---|---|---|
| | Before ageing (test I) | | After ageing (test II) | | |
| Test no. | Av. Energy at max load (J) | SD Energy (J) | Av. Energy at max load (J) | SD Energy (J) | Retention (%) |
| 4.1 | 13.8 | 3.9 | 6.0 | 1.1 | 44 |
| 4.2 | 16.6 | 0.7 | 6.8 | 0.3 | 41 |
| 4.3 | 15.5 | 2.1 | 5.1 | 0.9 | 33 |
| 4.4 | 12.9 | 2.2 | 5.6 | 0.5 | 43 |
| 4.5 | 12.4 | 0.3 | 2.2 | 0.3 | 18 |

TABLE 11

FACIES after bond failure

| Test no | Facies after failure | |
|---|---|---|
| | Before ageing (test I) | After ageing (test II) |
| 4.1 | c | a |
| 4.2 | ~c | a |
| 4.3 | c/a | a |
| 4.4 | ~a | a |
| 4.5 | ~a | a | c: cohesive fracture;
~c: rather cohesive fracture;
c/a: fracture both cohesive and adhesive;
~a: rather adhesive fracture;
a: adhesive fracture

The invention claimed is:

1. A method of treating a first metallic surface (S1) intended to be bonded to a second surface (S2) by adhesive bonding, and for imparting a resistance to the adhesive failure to the bonding, comprising treating a first metallic surface (S1) with at least one polymer (P) obtained by radical copolymerization of a mixture of:
   acrylic acid;
   methacrylic acid; and
   at least one methylated or not methylated allylcatechol which is selected from 4-allylbenzene-1,2-diol; 3-allylbezene-1,2-diol; corresponding eugenols; and mixtures thereof,
   wherein the second surface (S2) is a metallic surface.

2. The method according to claim 1, wherein treating the first metallic surface (S1) with at least one polymer (P) further imparts to the bonding a resistance to corrosive atmospheres and to wet atmospheres as measured by tensile tests defined in ASTM D-1002 10.

3. The method according to claim 1, wherein the polymer (P) contains a mixture of two isomers 4-allylbenzene-1,2-diol and 3-allylbenzene-1,2-diol as the allylcatechol.

4. The method according to claim 1, wherein the polymer (P) has a molecular weight between 10 and 150 kDa.

5. The method according to claim 1, wherein the polymer (P) contains acrylic acid (AA) at a content of 10 to 90% in mol; methacrylic acid (MAA) at a content of 1 to 90% in mol, and allylcatechol at a content of 1 to 20% in mol, each molar ratio being calculated on the basis of a total quantity of AA, MAA and allylcatechol, with a ratio MAA/AA of more than 1/1.

6. The method according to claim 1, wherein the first metallic surface (S1) is a surface comprising a metal selected from aluminum, steel, zinc, magnesium and their alloys.

7. The method according to claim 1, wherein the polymer (P) is used for treating both surfaces (S1) and (S2) before the adhesive bonding of the two surfaces.

8. The method according to claim 7, wherein the treatment of the surface (S1) and of the surface (S2) are followed by a rinsing step.

9. A process for bonding a first metallic surface (S1) with a second surface (S2) including:
   treating the first surface (S1) with at least one composition including the at least one polymer (P) as defined in claim 1; and
   optionally treating the second surface (S2) with at least one composition including the at least one polymer (P) in claim 1; and
   bonding the surfaces (S1) and (S2) via an adhesive composition applied between the two surfaces.

10. The process according to claim 9, wherein a composition comprising the polymer (P) is:
    a conversion composition including a polymer (P); and/or
    a solution or a dispersion of the polymer (P), applied on the surface after having applied a conversion coating on the surface to be treated; and/or
    an adhesive composition, that comprise a polymer (P).

11. A material comprising two adhesive-bonded surfaces including a first metal surface comprising a metal surface (S1) which is in all or part (i) treated with a polymer (P) as defined in claim 1 and (ii) bonded to a second surface (S2) via an adhesive, the material being a material having a metal surface in all or part covered by:
    at least one coating comprising the at least one polymer (P) as defined in claim 1; and/or
    a layer comprising a reaction product of the polymer (P) as defined in claim 1 with a metal of the treated surface or another compound present in the layer, or the polymer (P) strongly linked with the other compound.

12. The method according to claim 3, wherein a molar ratio of 4-allylbenzene-1,2-diol to 3-allylbenzene-1,2-diol between 30/70 and 70/30.

* * * * *